United States Patent [19]

Akiyama et al.

[11] 4,081,583

[45] Mar. 28, 1978

[54] ELECTROSTATIC RECORDING MATERIAL

[75] Inventors: Toyomi Akiyama, Sakai; Taiji Higaki, Nishinomiya; Eiichiro Shiratsuchi, Tokyo; Eijiro Tagami, Yokohama, all of Japan

[73] Assignees: Japan Synthetic Rubber Co., Ltd.; Kanzaki Paper Manufacturing Co., Ltd., both of Japan

[21] Appl. No.: 533,703

[22] Filed: Dec. 17, 1974

Related U.S. Application Data

[63] Continuation-in-part of Ser. No. 86,630, Nov. 3, 1970, abandoned.

[30] Foreign Application Priority Data

Nov. 15, 1969 Japan ................................ 44-91544

[51] Int. Cl.$^2$ ................................ B32B 15/08

[52] U.S. Cl. ................................ 428/457; 428/461; 428/462; 428/463; 428/512; 428/513; 428/514; 428/511; 428/521; 428/522; 428/523

[58] Field of Search ................ 252/500; 96/1.5, 1.8; 162/138; 117/201, 161 UD, 161 UH, 161 UG, 161 UT, 155 UA; 428/512, 500, 292, 461, 462, 463, 458, 513, 514, 521, 522, 523, 511, 457; 260/29.7 N, 29.7 D; 427/74, 388, 395, 391, 121, 58, 388 C, 385 R

[56] References Cited

U.S. PATENT DOCUMENTS

| | | | |
|---|---|---|---|
| 2,875,054 | 2/1959 | Griggs et al. | 260/29.7 W |
| 3,216,853 | 11/1965 | Gess | 428/292 |
| 3,428,485 | 2/1969 | Bonzagni | 428/513 |
| 3,459,593 | 8/1969 | Cole | 428/512 |
| 3,487,032 | 12/1969 | Guziak et al. | 428/512 X |
| 3,530,080 | 9/1970 | Kirkwood | 428/514 |
| 3,707,393 | 12/1972 | McDonald | 428/512 |
| 3,783,004 | 1/1974 | Parker | 428/512 X |
| 3,864,128 | 2/1975 | Paesschen et al. | 96/1.8 |
| 3,865,789 | 2/1975 | Wyhof | 96/1.8 X |
| 3,920,880 | 11/1975 | Akiyama et al. | 427/121 |
| 3,956,571 | 5/1976 | Takao et al. | 428/513 |

*Primary Examiner*—Cameron K. Weiffenbach
*Attorney, Agent, or Firm*—Craig & Antonelli

[57] ABSTRACT

An electrostatic recording material having a good workability and a very good recording characteristic is prepared by coating such a base sheet as paper, plastic film, metal plate, etc. with an aqueous dispersion comprising (A) 100 parts by weight of at least one water-isoluble polymer prepared from at least one monomer selected from the group consisting of (1) conjugated diolefinic monomers and (2) ethylenic monomers selected from the group consisting of linear olefins, branched olefins, aromatic vinyl compounds, vinyl cyanide compounds, alkyl acrylates, alkyl methacrylates, vinyl ethers, and vinyl halides, and (B) 1 to 200 parts by weight of at least one water-soluble salt selected from the group consisting of an ammonium salt and organic amine salt of a copolymer selected from the group consisting of (1) copolymers of unsaturated carboxylic acids and ethylenic monomers selected from the group consisting of linear olefins, branched olefins, aromatic vinyl compounds, vinyl cyanide compounds, alkyl acrylates, alkyl methacrylates, vinyl halides, acrylamide, methacyrlamide, and vinyl ethers, (2) copolymers of conjugated diolefinic monomers and unsaturated carboxylic acids, and (3) copolymers of conjugated diolefinic monomers, unsaturated carboxylic acids and ethylenic monomers selected from the group consisting of linear olefins, branched olefins, aromatic vinyl compounds, vinyl cyanide compounds, alkyl acrylates, alkyl methacrylates, vinyl halides, acrylamide, methacrylamide, and vinyl ethers, said water soluble salt of the copolymer containing 8 to 50 mole percent of carboxyl groups, by means of an air knife coater, roll coater, etc. It is possible to use not more than 6 parts by weight of the conventional nonionic emulsifier and/or a conventional anionic emulsifier together with said components.

10 Claims, No Drawings

ELECTROSTATIC RECORDING MATERIAL

CROSS-REFERENCES TO RELATED APPLICATIONS

This application is a continuation-in-part of application Ser. No. 86,630 filed on Nov. 3, 1970, and now abandoned.

This invention relates to an electrostatic recording material comprising a base sheet and a dried layer of aqueous dispersion of polymers laid on the surface of the base sheet.

Two of the principal methods presently used in the electric recording system are an electrophotography and an electrostatography. In the former, a charged or latent image is created on the surface of an electrophotographic stock, and a toner directly applied to create the desired image. An example of the electrophotographic stock is a composite layer of an electrophotoconductive material, normally sensitized zinc oxide; a resin binder; a barrier layer and a support sheet, normally paper with conductive treatment. At least the photo-conductive material normally possesses a high degree of electrical resistivity. A surface charge is applied by corona discharge. The charged surface is then exposed to the light. That portion of the surface which is exposed to the light becomes conductive and the charge dissipates away in proportion to the amount of light reaching the surface. This leaves a residual charge having a pattern corresponding to the matter to be reproduced on the surface layer. When a toner is applied, it is attracted to the charged image. A paper coating composition for use in such an electrophotographic paper is, for example, described in the U.S. Pat. No. 2,875,054 of Griggs et al.

The electrostatic recording material is different in recording mechanism and structure of recording material from an electrophotographic paper. The electrostatic recording material is applied to an electrostatic recording system which records electrical signals directly on the image-bearing layer without photoelectric conversion or photoconductive effect. The electrophotographic paper is always required to contain a photoconductive material such as sensitized zinc oxide which is the main component of image-bearing layer, and the binder to be used in the electrophotographic paper is required to have properties different from those required for the polymer used in the formation of a dielectric film for the electrostatic recording material. That is, adhesiveness, adsorbability to zinc oxide, photosensitivity, dark resistivity and the like are required.

The electrostatic recording system has recently been widely applied to a facsimile or a computer input-output system or the like as a system suitable for high speed recording in a high speed telecommunication system, a high speed graphic reproduction system, etc., but the electrostatic recording material as a recording medium basically comprises a highly dielectric film layer, which serves as an electric-charge-retentive layer, and a base sheet of lower resistance, which supports the film layer. Electrostatic images of electrical signal formed on the electric-charge-retentive layer are made visible by a toner which has a polarity opposite to the polarity of the electrostatic image charge, and brought into permanent visible images by further fixing treatment, if necessary.

The charge-retentive layer corresponds to a dielectric member in a condenser. To increase the charge density of the electrostatic image and enhance the recording efficiency, it is preferable that the effective film thickness is as thin as possible, but the practical film thickness is about 2 to 20 microns because a strength capable of withstanding a strong electrical field such as $10^6$ V/cm is also required.

It is known that the electric-charge-retentive layer of the electrostatic recording sheet may consists essentially of any kind of insulating or dielectric resin such as polyethylene, polyvinyl acetal, silicone resin, polyacrylate, polyvinylidene chloride, nitrocellulose, polyvinyl acetaldehyde, vinyl acetate-vinyl chloride copolymer, vinyl acetate-crotonic acid copolymer, acrylic acid ester-methacrylic acid ester copolymer, etc. and the mixture thereof. These insulating polymeric materials are commonly coated onto the surface of base sheet as a solution dissolved in a suitable organic solvent such as acetone, toluene, benzene, methyl ethyl ketone, etc. However, the use of the organic solvent solution of the polymeric materials is not desirable for several reasons including fire hazard, toxicity, handling and economy of the organic solvent.

A number of improvements have so far been proposed in order to overcome or compensate for the above disadvantages. However, a practical, satisfactory product has not yet been obtained. Many so-called improvements introduce unexpected additional difficulties. For example, such water-soluble natural polymers as casein, gelatin, starch, etc. have a low specific resistance and thus a poor dielectric strength as well as a low charge acceptance. Accordingly, such natural polymers are not practically used. For another example, as a method for using an aqueous dispersion of a polymeric material in an electrostatic recording material, Japanese Patent Publication No. 14,348/63 discloses a method for coating paper with an emulsion or suspension prepared by emulsifying or suspending random copolymers, graft copolymers or block copolymers having a second order transition point of 10° C or higher, which are comprised of vinyl acetate-acrylic ester, vinyl acetate-methacrylic ester or vinyl acetate-styrene, with a nonionic or an anionic surface active agent. However, in such an aqueous dispersion, it is hard to maintain good mechanical and thermal stability when coated onto the base sheet. An increase in the amount of the emulsifier for improving the stability inevitably lowers the recording characteristics, and it is very difficult to change practical applicabilities such as a flexibility of the film to a great degree and to prevent triboelectricity and background, etc.

Moreover, such a polymer dispersion as mentioned above is unsuitable for making a recent electrostatic recording material. That is, recent electrostatic recording material is required to have many improved characteristics, for example, it is highly desirable that the electrostatic recording material may not have an appearance greatly different from the conventional papers of common business usage. It is also desirable that the electric-charge-retentive layer surface be suitable for the addition of notes, stamp marks, and similar markings. And, in order to reduce the gloss of dielectric layer surface and to permit writing or marking to be more easily done, it has been proposed that inorganic or organic particles are included in the insulating resin dissolved in a suitable orgaic solvent. However, it has not been practically done to include inorganic or organic particles in an aqueous dispersion of an insulating polymer material which forms electric-charge-retentive layer. The reason is that the addition of inorganic or organic particles causes such disadvantages as an decrease of mechanical and thermal stability of the dispersion, or a reduction of electrical characteristics of the recording sheet material.

As a result of various studies on a method for preparing an electrostatic recording material using an aqueous dispersion of polymeric materials, the present inventors have found that, when water-soluble salts of polymers containing carboxyl groups are allowed to be contained in an aqueous dispersion of polymers, it is possible to select a wide range of monomer compositions and apply the thus prepared aqueous dispersion onto the surface of base sheet in a very stable state mechanically and thermally, and the thus obtained electrostatic recording material has an excellent recording characteristic. Furthermore, all the disadvantages encountered when an organic solvent solution of polymeric material is used, that is, inflammability, toxicity, difficulty in working, economy, etc. have been completely eliminated by use of the present aqueous dispersion.

The principal object of this invention is to provide a new electrostatic recording material superior to those hitherto known.

An important object of this invention is to provide an improved electrostatic recording material having an electric-charge-retentive layer deposited from an aqueous coating composition.

A further object of this invention is to provide an electrostatic recording material having an excellent recording characteristic.

A still further object of this invention is to provide an electrostatic recording material having a sufficient flexibility so that it will not tend to flake off or crack under the pressure.

Other objects and advantages of this invention will be clear from the following description.

According to this invention, an electrostatic recording material is provided by coating a surface of a base sheet with an aqueous dispersion (including emulsion and suspension) comprising (A) 100 parts by weight of at least one water-insoluble polymer prepared from at least one monomer selected from the group consisting of (1) conjugated diolefinic monomers and (2) ethylenic monomers selected from the group consisting of linear olefins, branched olefins, aromatic vinyl compounds, vinyl cyanide compounds, alkyl acrylates, alkyl methacrylates, vinyl ethers, and vinyl halides, and (B) 1 to 200 parts by weight of at least one water-soluble salt selected from the group consisting of an ammonium salt and organic amine salt of a copolymer selected from the group consisting of (1) copolymers of unsaturated carboxylic acids and ethylenic monomers selected from the group consisting of linear olefins, branched olefins, aromatic vinyl compounds, vinyl cyanide compounds; alkyl acrylates, alkyl methacrylates, vinyl halides, acrylamide, methacrylamide, and vinyl ethers; (2) copolymers of conjugated diolefinic monomers and unsaturated carboxylic acids, and (3) copolymers of conjugated diolefinic monomers, unsaturated carboxylic acids and ethylenic monomers selected from the group consisting of linear olefins, branched olefins, aromatic vinyl compounds, vinyl cyanide compounds, alkyl acrylates, alkyl methacrylates, vinyl halides, acrylamide, methacrylamide, and vinyl ethers; said water soluble salt of the copolymer containing 8 to 50 mole percent of carboxyl groups. The resulting coated product is then dried, whereby a dielectric or insulating electric-charge-retentive layer is formed on the surface of the base sheet.

The ethylenic monomers used in this invention have preferably 2 to 25 carbon atoms and include linear or branched olefins, such as ethylene, propylene, butylene, etc.; aromatic vinyl compounds such as styrene, vinyltoluene, halogen-substituted styrenes, etc.; vinyl cyanide compounds such as acrylonitrile, methacrylonitrile, etc.; alkyl acrylates and methacrylates such as butyl acrylate, methyl methacrylate, etc.; vinyl ethers such as isopropyl vinyl ether, methyl vinyl ether, etc.; and vinyl halides such as vinyl chloride, vinylidene chloride, etc. More preferable are the linear and branched olefins, the aromatic vinyl compounds, the alkyl acrylates and methacrylates and the vinyl halides.

The conjugated diolefinic monomers used in this invention have preferably 4 to 10 carbon atoms and include, for example, butadiene, isoprene, chloroprene, piperylene, etc.

Particularly preferable ethylenic and conjugated diolefinic monomers are alkyl acrylates, alkyl methacrylates, styrene and butadiene. These monomers may be used alone or in admixture of at least two.

The water-soluble salts of polymers containing carboxyl groups used in this invention act as a dispersing agent capable of dispersing said water-insoluble polymers into water, and include, for example, ammonium or organic amine salts of copolymers of such ethylenic monomers as ethylene, styrene, vinyltoluene, acrylonitrile, methacrylonitrile, acrylates, methacrylates, vinyl halides, acrylamide, methacrylamide, halogen-substituted styrenes, etc. (more preferably, ethylene, styrene, vinyltoluene, acrylate, methacrylate, vinyl halide, halogen-substituted styrenes) with such unsaturated carboxylic acids as acrylic acid, methacrylic acid, crotonic acid, itaconic acid, maleic acid, fumaric acid, etc. or monoesters of these di-carboxylic acids; ammonium or organic amine salts of copolymers of such conjugated diolefins as butadiene, isoprene, piperylene, chloroprene, cyclopentadiene, etc., with said unsaturated carboxylic acids or monoesters; and ammonium or organic amine salts of copolymers of said ethylenic monomers, said conjugated diolefins and said unsaturated carboxylic acids or monoesters. Among unsaturated carboxylic acid, monobasic carboxylic acid, especially methacrylic acid, is exemplified as the most useful acid of this invention.

Said polymers containing carboxyl groups may be prepared by polymerizing the above-mentioned monomer mixture by emulsion or suspension polymerization in aqueous phase in the presence of an emulsifying agent or a suspending agent, or by solution polymerization in an organic solvent. In view of stability, the solution polymerization method is preferable. The solution polymerization method is disclosed, for example, in Japanese Pat. No. 545,491.

These water-soluble salts of polymers contribute to stabilization of the aqueous dispersion, but when their carboxyl group contents are considerably increased, the recording characteristics are damaged. That is, if the carboxyl group content in the polymer is more than 50 mole percent, the electrical resistivity in the dielectric layer of the resultant electrostatic recording material lowers and the charge decay is accelerated thereby. Such a high content of carboxyl group is not desirable because the electrical characteristics lower especially in the condition of high humidity. On the other hand, if the carboxyl group content in the polymer is less than 8 mole percent, the polymer becomes slightly soluble or insoluble, with the result that a stable dispersion which is an object of this invention cannot be obtained. Therefore, practically, it is necessary that the carboxyl group content of said polymer is in the range of 8 to 50 mole percent.

The term "mole percent of carboxyl groups" or "carboxyl group content" used herein means the number of carboxyl groups contained in the copolymer per 100 (on average) monomer units constituting the copolymer and is calculated as follows:

If it is assumed that a copolymer is composed of monomers A, B and C (monomer C having carboxyl groups) in a molar ratio of $a : b : c$, the carboxyl group content of the copolymer should be $$\frac{c \times x}{a + b + c} \times 100$$

in which $x$ is the number of carboxyl groups contained in one molecule of monomer C, and hence, when monomer C is a monocarboxylic acid, $x$ is 1 and when monomer C is a dicarboxylic acid, $x$ is 2. Based on this manner of determining the carboxyl group content, the carboxyl group content of the styrenemaleic acid alternating copolymer is calculated as follows:

$$\frac{1 \times 2}{1 + 1} \times 100 = 100\,\%$$

In view of the stability of the aqueous dispersion of polymer, the use of the emulsifiers is preferable. However, in view of the recording characteristics, it is not desirable that the aqueous dispersion contains a large amount of the emulsifier, since the emulsifier has an undesirable influence upon the recording characteristics, for example, low charge acceptance, background, etc., depending upon the amount of the emulsifier used. Therefore, it is desirable that the stable aqueous dispersion of polymer can be obtained by using a minimum amount of emulsifier, and it is more desirable that an aqueous dispersion of polymer does not contain the emulsifier.

According to the embodiment of this invention, even when only the water-soluble polymer containing carboxyl groups is used without using any emulsifier, an aqueous dispersion of the polymer having an excellent mechanical and thermal stability and recording characteristics can be obtained by properly selecting the kind and amount of said polymer.

Of course, the aqueous dispersion of this invention may contain suitable emulsifiers, if desired. However, the total amount of the emulsifiers must not exceed 6 parts by weight per 100 parts by weight of the water-insoluble polymer. If the total amount of emulsifiers is more than 6 parts by weight per 100 parts by weight of the water-insoluble polymer, the electrical resistivity in a dielectric layer of the resultant electrostatic recording material lowers and the charge decay is accelerated thereby. Such an amount of emulsifier is not desirable because the electrical characteristics lower especially in the condition of high humidity.

The useful emulsifiers in this invention are selected from the group consisting of the nonionic emulsifiers and the anionic emulsifiers. The nonionic emulsifiers used in this invention include those heretofore usually used as nonionic surface active agents, such as polyoxyethylene alkyl ethers, polyoxyethylene aryl ethers, polyoxyethylene alkyl esters, polyoxyethylene aryl esters, polyoxyethylene-polyoxypropylene block copolymers, etc.

The anionic emulsifiers used in this invention include those heretofore usually used as anionic surface active agents, for example, ammonium salts and amine salts of higher fatty acids, higher alkylsulfuric acids, alkylarylsulfonic acids, dialkylsulfosuccinic acids, resin acids, etc.

The aqueous dispersion of polymer used in this invention may be prepared by, for example, the following methods:

(i) The monomers are emulsified and dispersed with the water-soluble polymer and then polymerized.

(ii) The monomers are emulsified and dispersed with the water-soluble polymer and the emulsifier, and then polymerized.

(iii) The monomers are emulsified and dispersed with the emulsifier and then polymerized. To the thus obtained aqueous polymer dispersion is added the water-soluble polymer.

(iv) The water-soluble polymer is further added to the aqueous polymer dispersion obtained in above (i).

(v) The water-soluble polymer and a conventional emulsifier are further added to the aqueous polymer dispersion obtained in above (i).

(vi) The water-soluble polymer is further added to the aqueous polymer dispersion obtained in above (ii).

(vii) The monomers are polymerized by a solution polymerization method, and the resulting polymer solution is emulsified and dispersed in water with the water-soluble polymer and/or the emulsifier. If necessary, the water-soluble polymer is further added thereto.

Practically, methods (i) to (vii) are selected depending upon the kind of the materials used and purpose, and in particular, methods (i), (ii), (iv) and (vi) are preferable. In this case, the polymerization can be effected under conventional emulsion polymerization conditions.

The water-soluble salt of polymer in this invention is used to enable the amount of the emulsifier to be as small as possible, thereby obtaining a stable aqueous dispersion, and that when a fine powder pigment is dispersed in the aqueous dispersion, if necessary, the water-soluble salt of polymer also contributes to the formation of a stable, protective colloid dispersion. The above functional role of the water-soluble salt of polymer can be exhibited when the salt is used in a proportion of at least 1 part per 100 parts by weight of the water-insoluble polymer of this invention. However, when the proportion of the water-soluble salt of polymer to the water-insoluble polymer is too high, (1) the flow properties of color are deteriorated, (2) the hygroscopicity becomes large and the characteristic at a high humidity is deteriorated, and (3) a high solid content color dispersion is difficult to obtain, and hence, the heat loss is large in coating with a coater and drying. Therefore, in practice, the appropriate proportion is up to 200 parts by weight of the water-soluble salt of polymer per 100 parts by weight of the water-insoluble polymer. The aqueous polymer dispersion of this invention must satisfy the electrostatic recording characteristics and also must have such properties that it is film-formable under the conditions for conventional coater, is good in toner fixation at room temperature to hot air (about 80° C), is excellent in anti-blocking, and the like.

In this invention, the aqueous dispersion of polymer can be used alone and also in the form of a mixture with an additive, for example, inorganic or organic particles such as clay, kaolinite, calcined clay, clay surface-treated with such chemicals as fat or hydrophobic resin, calcium carbonate, barium sulfate, lead oxide, aluminum sulfate, starch powder, polystyrene, polyethylene, polyacrylonitrile, polyvinylidene chloride, etc. Such an aqueous dispersion provides a sufficient mechanical and thermal stability, and is suitable for making an electrostatic recording material having excellent recording characteristics, particularly, a natural appearance like a business paper and marking ability. The aqueous dispersion of polymer of this invention may also contain other additives, for example, dispersing agents such as polyphosphate, sodium salt of alkylnaphthalene sulfonate, etc.; thickeners or protective colloids such as polyvinyl alcohol, carboxymethyl cellulose, gum arabic, alginates, gelatine, etc.; plastisizers; dyestuffs; defoamers; etc. However, it is more desirable in view of recording characteristics that the dielectric layer of an electrostatic recording material does not contain contaminations unless they are necessary. From this point of view, the stable aqueous dispersion of polymer according to this invention need not contain the above-mentioned dispersing agents or protective colloids.

As mentioned above, it is known that the photoconductive layer of the electrophotographic recording material consists of an inorganic pigment, such as French process ZnO, CdS, $TiO_2$, or the like, and an adhesive. However, these inorganic pigments are restricted to photo-conductive ones, and these are strictly excluded from the inorganic pigments used in this invention, because such a photosensor as to be able to liberate a large amount of a movable charge carrier such as the photo-conductive ZnO rather affect adversely the recording characteristics in the case of electrostatography.

In the electrophotographic recording material, the practical solid weight ratio of the inorganic pigment to the adhesive ranges from 4/1 to 5/1 for developing sufficiently the function of a photosensor such as photoconductive ZnO, and the average film thickness of the photo-conductive layer is generally required to be 15 to 20 microns. Under such conditions, the electrophotographic recording material can maintain its dielectric strength, and control the space charge generated in the photo-conductive layer.

On the other hand, in the case of the electrostatic recording material, the amount of the non-photoconductive pigment to be contained in the dielectric layer may be at most 100 parts by weight per 100 parts by weight of the total insulating or dielectric polymer. However, it is preferable to use the same in the necessary minimum amount because the electric properties of the electrostatic recording material are deteriorated with an increase in the proportion of pigment used. The weight ratio of the pigment to the insulating polymer is ordinarily up to 2/1. The average film thickness of the insulating or dielectric layer does not exceed 15 microns in almost all cases. For example, in the case of an electrostatic recording material used in the recording system in which the electric charge is impressed directly from the metal electrode, the average film thickness is usually 2 to 10 microns in consideration of the contribution of the capacity for enhancing the response. Further, in the case of an electrostatic recording material for use as an charge receptor medium the average film thickness is generally 10 to 15 microns in consideration of transfer efficiency, and when it is more than 15 microns, the charge density of latent image is rather reduced and the recording characteristics are deteriorated.

According to this invention, the electrostatic recording material can be prepared by coating a base sheet with said aqueous dispersion of polymers by means of a coater widely used in preparing ordinary coated paper, for example, an air knife coater, roll coater, blade coater, etc., as it is, and drying the coated base sheet.

As the base sheet for the recording material of this invention, paper, plastic sheet (synthetic paper, plastic film or the like), metal plate, etc. may be used, but in view of a low cost and ready workability, paper is most preferable.

It is necessary that the base sheet has a proper physical strength, smoothness, extensibility, whiteness, bulkiness, thickness, etc., and further it is generally necessary that the base sheet has an electroconductivity corresponding to a volume resistivity of $10^5$–$10^{11}$ $\Omega/cm^2$ at a relative humidity of 10–90%. Therefore, in the case of the most frequently used paper base sheet, a low resistance treatment is usually applied to the paper by impregnating or coating the paper with inorganic salts, carbon black, or fine powders of aluminum, copper, nickel, etc., or polymeric electrolyte, for example, vinylbenzyl quaternary ammonium salt, sodium alginate, sodium polyacrylate, sodium polystyrene sulfonate, etc.

The electrostatic recording material of this invention is not only used in a system for impressing signal charges directly onto a surface of a dielectric material layer, but also practically applicable as a charge receptor medium (charge-retentive layer) in the so-called method of transfer of electrostatic images wherein electrostatic images formed on a master plate are transferred to another charge-retentive layer, developed and recorded. As such a method of transfer of electrostatic image, there has been known, for example, a method for transferring electrostatic images formed on the master plate to a charge-retentive layer by applying an electric field thereto or forming a short circuit between them. The values of electric resistance of the base sheet of the charge receptor medium used in such a method of transfer of electrostatic images can take a wider range than that of the system for directly impressing electrical signals. For example, in the case of the paper base sheet, the ordinary quality paper may be used as it is without any treatment with said electroconductivity-improving agent.

As will be understood from the above, the characteristics and advantages of this invention are as follows:

The electric-charge-retentive layer of the product is formed by polymers consisting of monomers selected from the wide range, and it permits a clearer image with less "noise" and less "background" even under changes in temperature or external humidity. Further, the electric-charge-retentive layer has a sufficient flexibility and does not tend to flake off or crack under a pressure such as the contact with the recording stylus. Furthermore, the aqueous dispersion of polymer of the present invention has a good thermal and mechanical stability, and therefore, easy operation is made possible through the conventional coating process. And also, the above coating process is done under preferable conditions; that is, free from fire hazard and toxicity and at considerably lower cost.

The image-retentive layer of this invention has also distinctive characteristics in writing and stamping in water base ink, as a result of using the water soluble salts of polymer in the layer.

If desired, the layer of this invention can easily be made more writable and stampable by allowing some organic or inorganic powder materials to be contained therein. In such a case, the powder can easily be dispersed into the aqueous dispersion because of the aqueous phase. Thus, the surface of the electric-charge-retentive layer substantially corresponds to the so-called mat finish and presents a natural appearance similar to commonly used business paper. And also the surface is easy to write upon with a pencil or ballpoint pen and also easy to stamp or mark in fluid pen ink because of the good receptivity and retention.

Now, the present invention will be explained in detail, referring to Examples, but these Examples are merely illustrative, but not limitative of the present invention. In the Examples, parts and percentages representing proportions are parts by weight and % by weight, respectively, unless otherwise specified.

EXAMPLE 1

Polymer Dispersion Containing Emulsifier

In 50 parts of methanol containing 3 parts of azobisisobutylonitrile and 5 parts of tertiary dodecylmercaptan as chain transfer agent, 100 parts of a monomer mixture consisting of 30% of butadiene, 55% of methyl methacrylate and 15% of methacrylic acid was subjected to solution polymerization to obtain a solution of a terpolymer having 13.6 mole percent of carboxyl groups in methanol. To this solution were added ammonia in an amount equivalent to the methacrylic acid and water to form an aqueous solution of ammonium salt of the terpolymer (I).

In water containing 0.3 part of hydrogen peroxide as initiator and 0.4 part of tertiary dodecylmercaptan as chain transfer agent, there were subjected to emulsion polymerization 10 dry parts of the aqueous solution of ammonium salt of terpolymer (I), 20 parts of butadiene, 80 parts of styrene and 2 parts of a nonionic emulsifier (polyoxyethylene lauryl ether, HLB: 17). The solids content of the thus obtained aqueous dispersion of polymer was adjusted to 40%.

The thus obtained dispersion was coated on a surface of paper having a thickness of 55 μ, which had been subjected to a low resistance treatment by impregnating the paper with polyvinylbenzyltrimethyl ammonium chloride, by means of an air knife coater, and then dried with hot air at 120° C, whereby a dry film having a thickness of 5 μ was formed. The surface resistivity of the thus obtained electrostatic recording material was $10^{14}$ ohm at 20° C, 60% RH (relative humidity) and 100 volts DC. Pulse signals of −750 V and 10 μ sec were impressed onto the electrostatic recording material by means of single stylus recording head having a line density of 6 lines/mm to form electrostatic images, and then the impressed recording material was subjected to magnetic brush development by a toner for the negative charge development, whereby clear recording images having a very good contrast were obtained. When high pressure pulse signals of −1000 V and 50 μ sec were impressed to said recording material by means of a letter-type electrode, the images made visible by a toner for the negative charge development were very clear without any dielectric breakdown of the dielectric layer.

EXAMPLES 2 TO 6

The same procedure as in Example 1 was repeated, except that the aqueous solution of ammonium salt of terpolymer (I) and the nonionic emulsifier were used in the amounts shown in Table 1 to obtain aqueous dispersions, which were then coated on the same base sheet as in Example 1 in the same manner as in Example 1 to obtain electrostatic recording materials. These electrostatic recording materials were subjected to the same test as in Example 1 to find that they have good recording characteristics as in Example 1.

Table 1

| | Example No. | | | | |
|---|---|---|---|---|---|
| | 2 | 3 | 4 | 5 | 6 |
| Aqueous solution (I) (dry parts) | 11 | 22 | 30 | 50 | 100 |
| Nonionic emulsifier (parts) | 2 | 2* | 1.5 | 2 | 2 |

Note:
*Polyoxyethylene-polyoxypropylene block copolymer (HLB: 20).

EXAMPLE 7

Emulsion Polymerization in Presence of Water-Soluble Polymer Alone

To emulsion polymerization were subjected to 14 dry parts of the aqueous solution of ammonium salt of terpolymer (I) obtained in Example 1, 15 parts of butadiene, and 85 parts of styrene in water containing 0.3 part of hydrogen peroxide as initiator and 0.4 part of tertiary dodecylmercaptan as chain transfer agent. The solids content of the thus obtained aqueous dispersion of polymer was adjusted to 42%.

The thus obtained aqueous dispersion was coated onto a surface of paper having a thickness of 55 μ, which had been subjected to a low resistance treatment by impregnating the paper with lithium chloride and polyethylene glycol, by means of a roll coater, and was then dried with hot air at 120° C, whereby a dry film having a thickness of 7 μ was formed. The surface resistivity of the thus obtained electrostatic recording material was $10^{13}$ ohm at 20° C, 60% RH and 100 volts DC. Pulse signals of −900 V and 10μ sec were impressed onto the electrostatic recording material by means of a recording head with multi-styli having a line density of 6 lines/mm to form electrostatic images. When the recording material was subjected to a cascade development by a toner for the negative charge development, very clear recording images were obtained.

EXAMPLE 8

To emulsion polymerization were subjected 5.5 dry parts of the aqueous solution of ammonium salt of terpolymer (I) obtained in Example 1, 30 parts of butadiene, 20 parts of styrene and 1 part of a nonionic emulsifier (polyxyethylene lauryl ether, HLB: 17) in water containing 0.15 part of hydrogen peroxide as initiator and 0.2 part of tertiary dodecylmercaptan as chain transfer agent to obtain a first aqueous dispersion.

The same procedure as above was repeated, except that 50 parts of styrene was substituted for the 30 parts of butadiene and 20 parts of styrene to obtain a second aqueous dispersion. The first and second aqueous dispersions were mixed, and the solids content of the resulting mixture was adjusted to 40%.

The thus obtained aqueous dispersion was coated on the same base sheet as in Example 1 and dried in the same manner as in Example 1 to obtain an electrostatic recording material having good recording characteristics.

EXAMPLE 9

To emulsion polymerization were subjected 5.5 parts of the aqueous solution of ammonium salt of terpolymer (I) obtained in Example 1, 5 parts of butadiene, 45 parts of styrene and 1 part of a nonionic emulsifier (polyoxyethylene lauryl ether, HLB: 17) in water containing 0.15 part of hydrogen peroxide as initiator and 0.2 part of tertiary dodecylmercaptan as chain transfer agent to obtain a first aqueous dispersion.

The same procedure as above was repeated, except that 25 parts of butadiene and 25 parts of styrene were substituted for the 5 parts of butadiene and the 45 parts of styrene, respectively, to obtain a second aqueous dispersion. The first and second aqueous dispersions were mixed, and the solids content of the resulting mixture was adjusted to 40%.

The thus obtained aqueous dispersion was coated on the same base sheet as in Example 1 and dried in the same manner as in Example 1 to obtain an electrostatic recording material having good recording characteristics.

EXAMPLE 10

The same procedure as in Example 1 was repeated, except that the amount of the aqueous solution of ammonium salt of terpolymer (I) was 11 dry parts instead of the 10 dry parts, and 80 parts of methyl methacrylate was substituted for the 80 parts of styrene to obtain an aqueous dispersion of polymer having a solids content of 40%.

The thus obtained aqueous dispersion was coated on the same base sheet as in Example 1 and dried in the same manner as in Example 1 to obtain an electrostatic recording material having good recording characteristics.

EXAMPLE 11

The same procedure as in Example 1 was repeated, except that the amount of the aqueous solution of ammonium salt of interpolymer (I) was 11 dry parts instead of the 10 dry parts, and 20 parts of n-butyl acrylate was substituted for the 20 parts of butadiene to obtain an aqueous dispersion of polymer having a solids content of 40%.

This aqueous dispersion was coated on the same base sheet as in Example 1 and then dried in the same manner as in Example 1 to obtain an electrostatic recording material having good recording characteristics.

EXAMPLE 12

Recording Material having Opaque Dielectric Film due to Solid Particles Prepared by Suspension Polymerization of Styrene To solution polymerization was subjected 100 parts of a monomer mixture consisting of 20% of styrene, 65% of methyl methacrylate and 15% of methacrylic acid in methanol containing an initiator and a chain transfer agent to obtain a methanol solution of a terpolymer, to which ammonia in an amount equivalent to the methacrylic acid and water were then added to form an ammoniacal solution of the terpolymer.

To suspension polymerization were subjected 8 dry parts of the thus obtained aqueous solution of ammonium salt of the terpolymer, 40 parts of butadiene and 60 parts of styrene in water containing an initiator (an oil-soluble catalyst) and a chain transfer agent to obtain an aqueous dispersion of a polymer (I).

To suspension polymerization were subjected 8 dry parts of the aqueous solution of ammonium salt of the terpolymer, and 100 parts of styrene in water containing an initiator and a chain transfer agent to obtain an aqueous dispersion of a polymer (II).

Further, 100 parts of a monomer mixture consisting of 30% of butadiene, 10% of styrene, 45% of methyl methacrylate and 15% of methacrylic acid was subjected to solution polymerization in methanol containing an initiator and a chain transfer agent to obtain a methanol solution of a polymer, to which ammonia in an amount equivalent to the methacrylic acid and water were then added to form an aqueous solution of ammonium salt of polymer (III).

The above aqueous solution (I), (II), and (III) were blended in a solids weight ratio of 20 : 60 : 20, and the solids content of the resulting mixture was adjusted to 40% by use of water to obtain an ammoniacal aqueous dispersion.

In the same manner as in Example 1, an electrostatic recording material was prepared by use of this ammoniacal aqueous dispersion. The recording characteristics of the electrostatic recording material were good.

EXAMPLE 13

Change in Amount of Nonionic Emulsifier

The same procedure as in Example 1 was repeated, except that 2 dry parts of the aqueous solution of ammonium salt of terpolymer (I) and 6 parts of polyoxyethylene lauryl ether (HLB: 17) were substituted for the 10 dry parts of the aqueous solution of ammonium salt of terpolymer (I) and the 2 parts of polyoxyethylene lauryl ether, respectively, to obtain an electrostatic recording material having good recording characteristics.

EXAMPLE 14

Addition of Nonionic Emulsifier After Polymerization

A monomer mixture (100 parts) consisting of 20% of butadiene and 80% of styrene was polymerized in the presence of 11 parts of an ammonium salt of a copolymer of methyl methacrylate and methacrylic acid in a weight ratio of 85 : 15, and 2 parts of a block copolymer of polyoxylethylene-polyoxypropylene (HLB: 13) as nonionic emulsifier was added to the resulting polymer to obtain an aqueous dispersion of polymer.

In the same manner as in Example 1, an electrostatic recording material was prepared using this aqueous dispersion of polymer. The recording characteristics of the electrostatic recording material were good.

EXAMPLE 15

Addition of Water-Soluble Polymer After Preparation of Water-Insoluble Polymer in Presence of Emulsifier To emulsion polymerization were subjected 20 parts of butadiene, 80 parts of styrene and 3 parts of ammonium oleate in water containing an initiator and a chain transfer agent to obtain an aqueous dispersion. To 50 dry parts of the resulting aqueous dispersion was added 50 dry parts of the aqueous solution of ammonium salt of polymer (III) obtained in Example 12, to obtain an aqueous dispersion having a solids content of 40%.

In the same manner as in Example 1, an electrostatic recording material was prepared using this aqueous dispersion. The recording characteristics of the recording material were good.

EXAMPLE 16

Variation in Composition of Water-Soluble Polymer

The same procedure as in Example 1 was repeated, except that a monomer mixture consisting of 20% of styrene, 65% of methyl methacrylate and 15% of methacrylic acid was substituted for the monomer mixture and 11 dry parts of the resulting aqueous solution of ammonium salt of a terpolymer of styrene-methyl methacrylate-methacrylic acid (20 : 65 : 15) was substituted for the 10 dry parts of the aqueous solution of ammonium salt of terpolymer (I) to obtain an electrostatic recording material having good recording characteristics.

EXAMPLE 17

Variation in Composition of Water-Insoluble Polymer

To emulsion polymerization were subjected 8 dry parts of the aqueous solution of ammonium salt of terpolymer obtained in Example 16, 30 parts of butadiene and 70 parts of methyl methacrylate in water containing an initiator and a chain transfer agent to obtain an aqueous dispersion of a polymer.

In the same manner as in Example 1, an electrostatic recording material was prepared using this aqueous dispersion. The recording characteristics of the recording material were good.

EXAMPLE 18 TO 26

Variation in Composition of Water-Soluble Polymer

In the same manner as in Example 17, an aqueous dispersion was prepared from 40 parts of butadiene, 60 parts of styrene and 10 dry parts of the aqueous solution of ammonium salt of terpolymer obtained in Example 16, and then blended with an aqueous solution of ammonium salt of a carboxylcontaining copolymer as shown in Table 2 in a dry weight ratio of 50 : 50 to obtain an aqueous dispersion.

In the same manner as in Example 1, electrostatic recording materials were prepared using the resulting aqueous dispersions. The recording characteristics of all the recording materials were good.

Table 2

| Monomer (parts) | Example No. 18 | 19 | 20 | 21 | 22 | 23 | 24 | 25 | 26 | 27 |
|---|---|---|---|---|---|---|---|---|---|---|
| Butadiene | 30 | 30 | 20 | 30 | 20 | 30 | 30 | — | 30 | — |
| Styrene | 20 | 45 | 20 | 30 | 30 | 20 | 20 | 10 | 20 | — |
| Ethyl acrylate | — | — | — | — | — | — | — | 80 | — | — |
| Methyl methacrylate | 30 | — | 30 | — | — | 30 | 35 | — | 20 | — |
| Ethylene | — | — | — | — | — | — | — | — | — | 80 |
| Methacrylic acid | 20 | 25 | 30 | 40 | 50 | — | 14 | 10 | 15 | — |
| Acrylic acid | — | — | — | — | — | 20 | — | — | — | 20 |
| Itaconic acid | — | — | — | — | — | — | 1 | — | — | — |
| Monomethyl maleate | — | — | — | — | — | — | — | — | 15 | — |
| —COOH content (mole %) | 18.2 | 22.7 | 28.8 | 35.5 | 46.9 | 21.0 | 14.0 | 11.5 | 24.3 | 8.9 |

EXAMPLE 28

100 Parts of a monomer mixture of 80% of styrene and 20% of butadiene was polymerized in the presence of 15 dry parts of an aqueous solution of ammonium salt of a four-component copolymer of butadiene-styrene-methyl methacrylate-methacrylic acid (20 : 20 : 30 : 30 by weight), and the resulting polymerization product was mixed with 185 dry aprts of the same aqueous solution as above to obtain an aqueous dispersion.

In the same manner as in Example 1, an electrostatic recording material was prepared using this aqueous dispersion. The recording characteristics of the recording material were good.

EXAMPLE 29

A monomer mixture (100 parts) consisting of 80% of styrene and 20% of butadiene was polymerized in the presence of 10 dry parts of an aqueous solution of ammonium salt of a terpolymer of butadiene-styrene-methacrylic acid (20 : 30 : 50 by weight), and the resulting polymerization product was mixed with 90 dry parts of the same aqueous solution as above to obtain an aqueous dispersion.

In the same manner as in Example 1, an electrostatic recording material was prepared using this aqueous dispersion. The recording characteristics of the recording material were good.

EXAMPLE 30

Use of Pigment

The same procedure as in Example 1 was repeated, except that 15 parts of butadiene and 85 parts of styrene were substituted for the 20 parts of butadiene and 80 parts of the styrene, respectively, 5.5 dry parts of the aqueous solution of ammonium salt of terpolymer (I) was substituted for the 10 dry parts of the aqueous solution of ammonium salt of terpolymer (I), 4 parts of polyoxyethylene lauryl ether (HLB: 17) was substituted for the 2 parts of the emulsifier and 15 parts of clay powders were used, to obtain an aqueous dispersion.

In the same manner as in Example 1, an electrostatic recording material was prepared using this aqueous dispersion. The recording characteristics of the recording material were good.

EXAMPLE 31

Use of Pigment

The same procedure as in Example 1 was repeated, except that 18 dry parts of the aqueous solution of ammonium salt of terpolymer (I) was substituted for the 10 dry parts of the aqueous solution of ammonium salt of terpolymer (I), 2 parts of a block copolymer of polyoxyethylene-polyoxypropylene (HLB: 13) was substituted for the emulsifier and 20 parts of titanium oxide (rutile type) was used, to obtain an aqueous dispersion.

In the same manner as in Example 1, an electrostatic recording material was prepared using this aqueous dispersion. The recording characteristics of the recording material were good.

EXAMPLE 32

Use of Pigment

To emulsion polymerization was subjected 100 parts of a monomer mixture consisting of 30 parts of butadiene, 10 parts of styrene, 45 parts of methyl methacrylate and 15 parts of methacrylic acid in water containing 2 parts of ammonium salt of sulfonic ester of lauryl alcohol, an initiator and a chain transfer agent, and to the resulting aqueous dispersion was added an appropriate amount of ammonia to form an aqueous solution of ammonium salt of a polymer (I).

Calcined clay was well mixed with the above aqueous solution of ammonium salt of polymer (I) in a weight ratio of the former to the latter of 6 parts to 4 dry parts. The thus obtained dispersion was blended with the aqueous dispersion of polymer (I) obtained in Example 12 in a dry weight ratio of 6 : 4 to obtain an aqueous dispersion of a solids content of 40%.

In the same manner as in Example 1, an electrostatic recording material was prepared using this aqueous dispersion. The recording characteristics of the recording material were good.

EXAMPLE 33

Evaluation by Transfer of Electrostatic Image

Conventional fine paper comprising 60% NBKP (bleached soft wood kraft pulp), 40% LBKP (bleached hard wood kraft pulp) and 10% clay as filler, which was surface-sized with esterified starch and had a weight of 50 g/m$^2$, was used as a base sheet as it was. The same aqueous ammoniacal dispersion of polymers as in Example 1 was coated onto one side of said base sheet by means of an air knife coater, and then was dried with hot air at 120° C to form a dry film having a thickness of 5 $\mu$. The surface resistivity of the thus obtained electrostatic recording paper was $10^{13}$ ohm at 20° C, 60% RH and 100 volts DC.

Corona charge of $-7$ KV was applied to commercially available electronic photographic paper (zinc oxide photosensitive paper) in a dark place, to effect an exposure by positive pattern and form an electrostatic pattern. Then, the film surface of said electrostatic recording paper and the photosensitive layer of the photosensitive paper were placed upon each other, and the back sides of these papers were short-circuited while pressing the papers. After peeling, the electrostatic recording paper was taken into a light place and developed by a toner for the negative charge development and fixed, whereby a clear image having a good contrast was obtained. The electronic photographic paper, which was used as a transfer medium, was subjected to an extinction of the electrostatic images by its entire surface exposure to light, and then was used again as the transfer medium.

Controls A to D

Electrostatic recording materials were prepared using the same manner as in Example 1, and their recording characteristics were tested. However, sufficient image density was not obtained. When the recording voltage was elevated, the dielectric layer underwent dielectric breakdown and background.

| | |
|---|---|
| Control A | |
| Copolymer of butadiene-styrene (20 : 80) | 100 parts |
| Terpolymer of butadiene-methyl methacrylate-methacrylic acid (30 : 55 : 15) | 11 parts |
| Polyoxyethylene lauryl ether (HLB: 17) | 8 parts |
| Control B | |
| Copolymer of butadiene-styrene (20 : 80) | 100 parts |
| Terpolymer of butadiene-methyl methacrylate-methacrylic acid (30 : 55 : 15) | 1 part |
| Polyoxyethylene lauryl ether (HLB: 17) | 7 parts |
| Control C | |
| Copolymer of butadiene-styrene (20 : 80) | 100 parts |
| Polyoxyethylene lauryl ether (HLB: 17) | 8 parts |
| Control D | |
| Copolymer of butadiene-styrene (20 : 80) | 100 parts |
| Sodium dodecylbenzene sulfonate | 8 parts |

Control E

In the procedure of Example 32, photoconductive zinc oxide (Sazex #2000, Sakai Chemical Co., Ltd.) was substituted for the calcined clay. Seven parts of said photoconductive zinc oxide was added to 1.5 dry parts of the aqueous dispersion of polymer (I) obtained in Example 32 and the former was well dispersed in the latter, and the resulting dispersion was blended with the aqueous dispersion of a polymer (I) obtained in Example 12 in a dry weight ratio of 8.5 : 1.5 to obtain an aqueous dispersion having a solids content of 40%

Using this aqueous dispersion, an electrostatic recording material was prepared in the same manner as in Example 1 and estimated to find that the recording material had no satisfactory recording characteristics.

The above aqueous dispersion was coated on an aluminum foil to form a film having a dry thickness of 10 $\mu$, and then subjected to a charging test to obtain the result shown in Table 3, in which the result of the same test using the aqueous dispersion obtained in Example 32 is also shown.

Table 3

| | Saturated voltage |
|---|---|
| Example 32 | $-300$ volts |
| Control E | $-80$ volts |

In the above charging test, the film was repeatedly charged with a corona current of 2 microamperes at $-6$ KV at 20° C at 55% RH, and thereafter the saturated voltage was determined. When the saturated voltage is measured by this method, it is above $-200$ volts which the electrostatic recording material shows good performance, and below $-200$ volts the image density is too low to use the recording material in practice.

Control F

In the same manner for preparing terpolymer (I) as in Example 1, a terpolymer (carboxyl group content: 6.4 mole %) was prepared, except that a monomer mixture of 30% of butadiene, 63% of methyl methacrylate, and 7% of methacrylic acid was substituted for the monomer mixture, and to the resulting polymer solution were added water and $NH_4OH$ in an amount equivalent to the methacrylic acid. The solubility of the polymer was low and no transparent solution was obtained. In the same manner ss in Example 1, except that the resulting opaque ammonium salt solution in water was substituted for the aqueous ammonium salt solution of terpolymer (I) the polymerization of butadiene and styrene was effected. A large amount of a coagulate was produced and a stable latex could not be obtained.

EXAMPLE 34

Criticality of Carboxyl Group Content

Butadiene, styrene, methacrylic acid, azobisisobutyronitrile and methanol in the amounts shown in Table 4 were charged into a 300-cc pressure bottle, which was then stirred at 60° C for 16 hrs. at 30 rpm. in a polymerization vessel. One gram of azobisisobutyronitrile and 10 grams of methanol were thereafter added to the pressure bottle and the bottle was again stirred at 30 rpm. at 65° C for 5 hrs. and then at 70° C for 4 hrs. to obtain a copolymer having the carboxyl group content shown in Table 4. The resulting copolymer was mixed with $NH_4OH$ in an amount equivalent to the methacrylic acid used and an appropriate amount of water to form an aqueous solution of ammonium salt of the copolymer. The properties of the resulting solution are as shown in Table 4.

Table 4

| Run No. | | 1 | 2 | 3 |
|---|---|---|---|---|
| Materials charged (grams) | Butadiene | 30 | 20 | 20 |
| | Styrene | 45 | 35 | 20 |
| | Methacrylic acid | 25 | 45 | 60 |
| | Azobisisobutyronitrile | 3 | 3 | 3 |
| | Methanol | 50 | 50 | 50 |
| Carboxyl group content (mole %) | | 23 | 43 | 55 |
| Conversion (%) | | 95 | 97 | 95 |
| Total solids content (%) | | 20.8 | 19.5 | 17.1 |
| pH of solution | | 10.0 | 10.4 | 10.9 |
| Viscosity of solution (cps) | | 3650 | 2125 | 588 |
| Apperance | | Clear | Clear | Clear |

Into a 100-liter autoclave equipped with a jacket, a cooling coil and stirring blades werc charged 6 kg of styrene, 20.1 kg of methyl methacrylate, 3.9 kg of methacrylic acid, 0.9 kg of n-dodecylmercaptan, 0.9 kg of azobisisobutyronitrile and 15 kg of methanol, after which the resulting mixture was heated at 60° C for 2 hrs, at 65° C for 2 hrs and then at 70° C for 2 hrs. The resulting copolymer (conversion: 98%) was mixed with $NH_4OH$ in an amount equivalent to the methacrylic acid used and an appropriate amount of water to form an aqueous solution of ammonium salt of the copolymer (total solids content: 19.3%; pH: 10.1; viscosity: 22 cps; appearance: clear). Into a 100-liter autoclave equipped with a jacket, a cooling coil and stirring blades were charged 12.42 kg (2.4 kg as solids) of this aqueous solution, 12 kg of butadiene, 18 kg of styrene, 0.15 kg of azobisisobutyronitrile, 0.24 kg of tert-dodecylmercaptan and 13.98 of water (total amount: 24 kg), and the resulting mixture was heated at a temperature of 45° C for 10 hrs, at 50° C for 3 hrs and then at 60° C for 7 hrs to obtain an S-B latex (conversion: 100%). The viscosity of the latex obtained was 265 cps and the pH thereof was 10.1.

An aqueous dispersion was prepared by mixing 50 parts (as solids) of the aqueous solution obtained in Run No. 1, 2 or 3 with 50 parts (as solids) of the S-B latex obtained above at room temperature, and applied to one side of a conductive base paper (comprising 40% of hard wood bleached sulfate pulp and 60% of soft wood bleached sulfate pulp and impregnated with polyvinyl benzyltrimethylammonium chloride) having a basis weight of 48 g/m² by means of a wire wound coating rod so that the amount of solids in the dispersion on the paper was 5 g/m², and then dried at 120° C for 1 min to obtain an electrostatic recording material, which was then subjected to repeated charging with corona current of 2 microamperes for 60 sec at −6 KV by means of a turn-table type corona charger, and the surface voltage was determined by means of a vibrating reed electrometer at 23° C and 72% RH to obtain the results shown in Table 5.

Table 5

| Run No. | 1 | 2 | 3 |
|---|---|---|---|
| Saturated voltage (volts) | −410 | −200 | 0 |
| Decay ratio $V_{30}/V_s$ (%) | 91 | 60 | — |

Note:
Decay ratio refers to percent of the ratio of the surface voltage 30 seconds after corona charging off ($V_{30}$) to the saturated voltage ($V_s$).

A photosensitized polyvinyl carbazol film was charged in a dark place at −1200 volts, and exposed to light through the optical pattern of the original to form an electrostatic pattern on the film, on which the recording surface (coated surface) of the electrostatic recording material obtained in Run No. 1, 2 or 3 was then placed. The electrostatic image was trensferred to the electrostatic recording material by a short circuit method and developed with a liquid toner to obtain a visible image in Run Nos. 1 and 2. However, in Run No. 3, the electrostatic properties of the electrostatic recording material were rapidly deteriorated, and no visible image could be obtained.

EXAMPLE 35

Criticality of Amount of Emulsifier

Into a 100-liter autoclave equipped with a jacket, a cooling coil and stirring blades were charged 12.0 kg of butadiene, 4.0 kg of styrene, 18.0 kg of methyl methacrylate, 6.0 kg of methacrylic acid, 1.6 kg of azobisisobutyronitrile and 20 kg of methanol, after which the resulting mixture was heated at 60° C for 3 hrs, at 65° C for 3 hrs, at 70° C for 3 hrs, at 75° C for 3 hrs, at 80° C for 3 hrs, and then at 85° C for 4 hrs. The resulting copolymer (conversion: 97%) was mixed with 4.8 kg of 25% $NH_4OH$ aqueous solution and an appropriate amount of water to form an aqueous solution of ammonium salt of the copolymer (total solids content: 23.2%; pH: 8.4; viscosity: 1,600 cps; appearance: clear).

This aqueous solution was mixed with the S-B latex obtained in Example 33, and an emulsifier (polyxyethylene lauryl ether (HLB: 17.1) ) in the amounts shown in Table 6 to obtain an aqueous dispersion.

Table 6

| Run No. | 4 | 5 | 6 | 7 | 8 |
|---|---|---|---|---|---|
| S-B latex (dry parts) | 100 | 100 | 100 | 100 | 100 |
| Aqueous solution (dry parts) | 50 | 50 | 50 | 50 | 50 |
| Emulsifier (parts) | 0 | 4 | 6 | 8 | 10 |

The resulting aqueous dispersion was applied to one side of the same conductive base paper as in Example 33 by means of a wire wound coating rod so that the amount of solids in the dispersion on the paper was 10 g/m², and then dried at 120° C for 1 min to obtain an electrostatic recording material. This recording material was subjected to repeated charging with corona current of 2 microamperes for 60 sec at −6KV by means of a turn-table type corona charger, and the surface voltage was detected by means of a vibrating reed electrometer at 20° C and 73% RH to obtain the results shown in Table 7.

Table 7

| Run No. | 4 | 5 | 6 | 7 | 28 |
|---|---|---|---|---|---|
| Saturated voltage (volts) | −440 | −330 | −220 | −80 | 0 |

A photosensitized polyvinyl carbazol film was charged in a dark place at −1,200 volts, and exposed to light through the optical pattern of the original to form an electrostatic pattern on the film, on which the recording surface (coated surface) of the electrostatic recording material obtained in Run No. 4, 5, 6, 7 or 8 was placed. The electrostatic image was transferred to the electrostatic recording material by a short circuit method and developed with a liquid toner to obtain a visible image in Run Nos. 4, 5 and 6. However, in Run Nos. 7 and 8, the electrostatic properties of the electrostatic recording materials were rapidly deteriorated, and only poor visible images were obtained.

What is claimed is:

1. An electrostatic recording material on which an electrostatic latent image can be formed without photoelectric conversion or photo-conductive effect, consisting essentially of a base sheet selected from a group consisting of paper, plastic sheet and metal plate, said base sheet having a dried coating thereon of an electric-charge-retentive layer of dielectric polymeric film prepared from an aqueous dispersion comprising (A) 100 parts by weight of at least one water-insoluble polymer prepared from at least one monomer selected from the group consisting of (1) conjugated diolefinic monomers and (2) ethylenic monomers selected from the group consisting of linear olefins, branched olefins, aromatic vinyl compounds, vinyl cyanide compounds, alkyl acrylates, alkyl methacrylates, vinyl ethers, and vinyl halides, and (B) 1 to 200 parts by weight of at least one water-soluble salt selected from the group consisting of an ammonium salt and organic amine salt of a copolymer selected from the group consisting of (1) copolymers of ethylenic monomers selected from the group consisting of linear olefins, branched olefins, aromatic vinyl compounds, vinyl cyanide compounds, alkyl acrylates, alkyl methacrylates, vinyl halides, acrylamide, methacrylamide, and vinyl ethers and unsaturated monobasic carboxylic acids, (2) copolymers of conjugated diolefinic monomers and unsaturated monobasic carboxylic acids, and (3) copolymers of ethylenic monomers selected from the group consisting of linear olefins, branched olefins, aromatic vinyl compounds, vinyl cyanide compounds, alkyl acrylates, alkyl methacrylates, vinyl halides, acrylamide, methacrylamide, and vinyl ethers, conjugated diolefinic monomers and unsaturated monobasic carboxylic acids, said water soluble salt of the copolymer containing 8 to 50 mole percent of carboxyl groups, and said aqueous dispersion being prepared by emulsifying and dispersing the monomer or monomers for constituting the (A) polymer with the (B) water-soluble salt of copolymer containing carboxyl groups in the aqueous medium and then polymerizing the same.

2. The electrostatic recording material according to claim 20, wherein the (B) water-soluble salt of copolymer containing carboxyl groups is further added to the aqueous dispersion.

3. The electrostatic recording material according to claim 1, wherein the dielectric polymeric film additionally contains at least one non-photoconductive inorganic pigment in an amount of not more than 100 parts by weight per 100 parts by weight of the total dielectric polymer.

4. An electrostatic recording material on which an electrostatic latent image can be formed without photoelectric conversion or photo-conductive effect, consisting essentially of a base sheet selected from the group consisting of paper, plastic sheet and metal plate, said base sheet having a dried coating thereon of an electric-charge-retentive layer of dielectric polymeric film prepared from an aqueous dispersion comprising (A) 100 parts by weight of at least one water-insoluble polymer prepared from at least one monomer selected from the group consisting of (1) conjugated diolefinic monomers and (2) ethylenic monomers selected from the group consisting of linear olefins, branched olefins, aromatic vinyl compounds, vinyl cyanide compounds, alkyl acrylates, alkyl methacrylates, vinyl ethers, and vinyl halides, and (B) 1 to 200 parts by weight of at least one water-soluble salt selected from the group consisting of an ammonium salt and organic amine salt of a copolymer selected from the group consisting of (1) copolymers of ethylenic monomers selected from the group consisting of linear olefins, branched olefins, aromatic vinyl compounds, vinyl cyanide compounds, alkyl acrylates, alkyl methacrylates, vinyl halides, acrylamide, methacrylamide, and vinyl ethers and unsaturated monobasic carboxylic acids, (2) copolymers of conjugated diolefinic monomers and unsaturated monobasic carboxylic acids, and (3) copolymers of ethylenic monomers selected from the group consisting of linear olefins, branched olefins, aromatic vinyl compounds, vinyl cyanide compounds, alkyl acrylates, alkyl methacrylates, vinyl halides, acrylamide, methacrylamide, and vinyl ethers, conjugated diolefinic monomers and unsaturated monobasic carboxylic acids, said water soluble salt of the copolymer containing 8 to 50 mole percent of carboxyl groups, and said aqueous dispersion containing not more than 6 parts by weight of at least one emulsifier selected from the group consisting of nonionic emulsifiers and anionic emulsifiers per 100 parts by weight of the water-soluble polymer, said aqueous dispersion being prepared by emulsifying and dispersing the monomer or monomers for constituting the (A) polymer with the (B) water-soluble salt of copolymer containing carboxyl groups and the emulsifier in the aqueous medium and then polymerizing the same.

5. The electrostatic recording material according to claim 4, wherein the (B) water-soluble salt of copolymer containing carboxyl groups is further added to the aqueous dispersion.

6. The electrostatic recording material according to claim 4, wherein the dielectric polymeric film additionally contains at least one non-photoconductive inorganic pigment in an amount of not more than 100 parts by weight per 100 parts by weight of the total dielectric polymer.

7. An electrostatic recording material on which an electrostatic latent image can be formed without photoelectric conversion or photo-conductive effect, consisting essentially of a base sheet selected from the group consisting of paper, plastic sheet and metal plate, said base sheet having a dried coating thereon of an electric-charge-retentive layer of dielectric polymeric film prepared from an aqueous dispersion comprising (A) 100 parts by weight of at least one water-insoluble polymer prepared from at least one monomer selected from the group consisting of (1) conjugated diolefinic monomers and (2) ethylenic monomers selected from the group consisting of linear olefins, branched olefins, aromatic vinyl compounds, vinyl cyanide compounds, alkyl acrylates, alkyl methacrylates, vinyl ethers, and vinyl halides, and (B) 1 to 200 parts by weight of at least one water-soluble salt selected from the group consisting of an ammonium salt and organic amine salt of a copolymer selected from the group consisting of (1) copolymers of ethylenic monomers selected from the group consisting of linear olefins, branched olefins, aromatic vinyl compounds, vinyl cyanide compounds, alkyl acrylates, alkyl methacrylates, vinyl halides, acrylamide, methacrylamide, and vinyl ethers and unsaturated monobasic carboxylic acids, (2) copolymers of conjugated diolefinic monomers and unsaturated monobasic carboxylic acids, and (3) copolymers of ethylenic monomers selected from the group consisting of linear olefins, branched olefins, aromatic vinyl compounds, vinyl cyanide compounds, alkyl acrylates, alkyl methacrylates, vinyl halides, acrylamide, methacrylamide, and vinyl ethers, conjugated diolefinic monomers and unsaturated monobasic carboxylic acids, said water soluble salt of the copolymer containing 8 to 50 mole percent of carboxyl groups, and said (B) water-soluble salt of copolymer containing carboxyl groups being prepared by solution polymerization in methanol.

8. The electrostatic recording material according to claim 7, wherein the dielectric polymeric film additionally contains at least one non-photoconductive inorganic pigment in an amount of not more than 100 parts by weight per 100 parts by weight of the total dielectric polymer.

9. An electrostatic recording material on which an electrostatic latent image can be formed without photoelectric conversion or photo-conductive effect, consisting essentially of a base sheet selected from the group consisting of paper, plastic sheet and metal plate, said base sheet having a dried coating thereon of an electric-charge-retentive layer of dielectric polymeric film prepared from an aqueous dispersion comprising (A) 100 parts by weight of at least one water-insoluble polymer prepared from at least one monomer selected from the group consisting of (1) conjugated diolefinic monomers and (2) ethylenic monomers selected from the group consisting of linear olefins, branched olefins, aromatic vinyl compounds, vinyl cyanide compounds, alkyl acrylates, alkyl methacrylates, vinyl ethers, and vinyl halides, and (B) 1 to 200 parts by weight of at least one water-soluble salt selected from the group consisting of an ammonium salt and organic amine salt of a copolymer selected from the group consisting of (1) copolymers of ethylenic monomers selected from the group consisting of linear olefins, branched olefins, aromatic vinyl compounds, vinyl cyanide compounds, alkyl acrylates, alkyl methacrylates, vinyl halides, acrylamide, methacrylamide, and vinyl ethers and unsaturated monobasic carboxylic acids, (2) copolymers of conjugated diolefinic monomers and unsaturated monobasic carboxylic acids, and (3) copolymers of ethylenic monomers selected from the group consisting of linear olefins, branched olefins, aromatic vinyl compounds, vinyl cyanide compounds, alkyl acrylates, alkyl methacrylates, vinyl halides, acrylamide, methacrylamide, and vinyl ethers, conjugated diolefinic monomers and unsaturated monobasic carboxylic acids, said water-soluble salt of the copolymer containing 8 to 50 mole percent of carboxyl groups, and said (B) water-soluble salt of copolymer containing carboxyl groups being prepared by emulsion polymerization in water.

10. The electrostatic recording material according to claim 9, wherein the dielectric polymeric film additionally contains at least one non-photoconductive inorganic pigment in an amount of not more than 100 parts by weight per 100 parts by weight of the total dielectric polymer.

* * * * *